(12) United States Patent
Kondamuri et al.

(10) Patent No.: US 11,824,834 B1
(45) Date of Patent: *Nov. 21, 2023

(54) DISTRIBUTED FIREWALL THAT LEARNS FROM TRAFFIC PATTERNS TO PREVENT ATTACKS

(71) Applicant: VMware, Inc., Palo Alto, CA (US)

(72) Inventors: Chandra Sekhar Kondamuri, San Jose, CA (US); Mirko Dziadzka, Freising (DE); Abhinav Gupta, San Francisco, CA (US); Michael Granzow, Regensburg (DE); Christian Willi Robert Treutler, Regensburg (DE); Abhijeet Joglekar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/548,527

(22) Filed: Dec. 11, 2021

Related U.S. Application Data

(63) Continuation of application No. 16/448,470, filed on Jun. 21, 2019, now Pat. No. 11,201,855.

(Continued)

(51) Int. Cl.
*H04L 29/06* (2006.01)
*H04L 9/40* (2022.01)

(52) U.S. Cl.
CPC ...... *H04L 63/0263* (2013.01); *H04L 63/1425* (2013.01)

(58) Field of Classification Search
CPC ........................ H04L 63/0263; H04L 63/1425

(Continued)

(56) References Cited

U.S. PATENT DOCUMENTS 7,543,052 B1 * 6/2009 Cesa Klein ........... H04L 43/026
709/223
7,624,084 B2 * 11/2009 Chesla ................. H04L 63/168
706/46

(Continued)

FOREIGN PATENT DOCUMENTS

WO 2019246573 A1 12/2019

OTHER PUBLICATIONS

Author Unknown, "Sørensen-Dice Coefficient," Jun. 1, 2018, 4 pages, Wikipedia, retrieved from https://en.wikipedia.org/w/index.php?title=S%C3%B8rensen%E2%80%93Dice_coefficient&oldid=843899050.

(Continued)

*Primary Examiner* — Badrinarayanan
*Assistant Examiner* — Badri-Champakesan
(74) *Attorney, Agent, or Firm* — ADELI LLP

(57) ABSTRACT

In an embodiment, a distributed firewall that learns from traffic patterns to prevent attacks is configured to receive traffic comprising one or more uniform resource identifiers (URIs), where a URI of the one or more URIs includes one or more parameters and one or more corresponding values. The firewall is configured to classify the corresponding value(s) using a pre-configured classifier and obtain a statistical rule that specifies an allowable type and an allowable length for traffic containing the one or more parameters, where the statistical rule is generated based on the classification. The firewall is configured to apply the statistical rule to incoming traffic to allow or drop requests comprising the parameter(s).

18 Claims, 7 Drawing Sheets

Related U.S. Application Data

(60) Provisional application No. 62/688,781, filed on Jun. 22, 2018.

(58) Field of Classification Search
USPC .................................................. 726/1
See application file for complete search history.

(56) References Cited

U.S. PATENT DOCUMENTS

| | | | | |
|---|---|---|---|---|
| 8,079,080 | B2* | 12/2011 | Borders | G06F 21/606 726/22 |
| 8,151,341 | B1* | 4/2012 | Gudov | H04L 63/1408 726/13 |
| 8,180,886 | B2* | 5/2012 | Overcash | H04L 63/1425 709/224 |
| 8,214,497 | B2 | 7/2012 | Alperovitch et al. | |
| 8,635,690 | B2 | 1/2014 | Alperovitch et al. | |
| 8,931,043 | B2* | 1/2015 | Cooper | H04L 63/1441 726/1 |
| 9,313,175 | B2* | 4/2016 | Harrison | H04L 63/0263 |
| 9,483,286 | B2 | 11/2016 | Basavaiah et al. | |
| 9,519,775 | B2 | 12/2016 | Sridhara et al. | |
| 9,619,651 | B1 | 4/2017 | Leavy et al. | |
| 9,717,992 | B2* | 8/2017 | Harris | A63F 13/77 |
| 11,201,855 | B1 | 12/2021 | Kondamuri et al. | |
| 2003/0012372 | A1 | 1/2003 | Cheng | |
| 2008/0082662 | A1* | 4/2008 | Dandliker | H04L 63/10 709/225 |
| 2009/0044271 | A1 | 2/2009 | Benameur et al. | |
| 2012/0102541 | A1* | 4/2012 | Groskop | G06F 21/577 726/1 |
| 2013/0174267 | A1* | 7/2013 | Kass | H04L 63/14 726/26 |
| 2013/0254150 | A1* | 9/2013 | Harrison | G06N 5/02 706/46 |
| 2015/0020152 | A1* | 1/2015 | Litichever | G06F 21/604 726/1 |
| 2016/0050132 | A1* | 2/2016 | Zhang | H04L 43/026 370/252 |
| 2017/0104630 | A1* | 4/2017 | Shelton | H04L 43/08 |
| 2017/0149631 | A1* | 5/2017 | Brown | H04L 67/02 |
| 2017/0330096 | A1* | 11/2017 | Das Gupta | G06F 11/0769 |
| 2018/0332060 | A1* | 11/2018 | Johnson | H04L 63/0236 |
| 2018/0375784 | A1 | 12/2018 | Balakrishnan et al. | |
| 2019/0394216 | A1 | 12/2019 | Kondamuri et al. | |
| 2020/0012784 | A1* | 1/2020 | Orihara | G06F 21/554 |

OTHER PUBLICATIONS

Graham, Paul, "A Plan for Spam," Aug. 2002, 12 pages, retrieved from http://www.paulgraham.com/spam.html.

* cited by examiner

| Class Type | Frequency |
|---|---|
| FLAG | |
| DIGIT | |
| HEXDIGIT | |
| WORD | |
| TEXT | |
| TEXT MULTILINE | |
| SAFE TEXT | |
| SAFE TEXT MULTILINE | |
| PASSWORD | |
| SPECIAL | |
| OTHER | |

FIG. 3A

| Length | Frequency |
|---|---|
| EMPTY | |
| SMALL | |
| MEDIUM | |
| LARGE | |
| HUGE | |

DISTRIBUTED FIREWALL THAT LEARNS FROM TRAFFIC PATTERNS TO PREVENT ATTACKS

CROSS REFERENCE TO OTHER PRIOR APPLICATIONS

This application is a continuation application of U.S. patent application Ser. No. 16/448,470, filed Jun. 21, 2019. U.S. patent application Ser. No. 16/448,470 claims priority to U.S. Provisional Patent Application No. 62/688,781 entitled DISTRIBUTED FIREWALL BY LEARNING FROM TRAFFIC PATTERNS TO PREVENT ATTACKS filed Jun. 22, 2018 U.S. Provisional Application 62/688,781 and U.S. patent application Ser. No. 16/448,470 are incorporated herein by reference.

BACKGROUND OF THE INVENTION

A Web application firewall (WAF) is an application layer firewall that protects computer systems from attacks. A conventional firewall monitors, filters, and blocks HTTP traffic to and from a web application using layer 3 and layer 4 information of a TCP/IP stack. For example, the Web application firewall inspects HTTP transactions and determines whether to service the HTTP traffic such as forwarding the request to a backend server. A Web application firewall parses the HTTP traffic using rule-based logic or signature-matching to detect and prevent attacks. Typically rules and signatures (pieces of code known to be malicious) are stored in a database. As HTTP traffic comes in, the Web application matches parts of the traffic to the rules or signatures. As attacks become more sophisticated and malicious actors become more creative, Web application firewalls may need intensive computing resources to accurately and efficiently prevent cyber-attacks.

BRIEF DESCRIPTION OF THE DRAWINGS

Various embodiments of the invention are disclosed in the following detailed description and the accompanying drawings.

FIG. 3A shows an example of classifying value types corresponding to parameters of a uniform resource identifier (URI).

FIG. 3B shows an example of classifying length types corresponding to parameters of a uniform resource identifier (URI).

DETAILED DESCRIPTION

Figure 1:
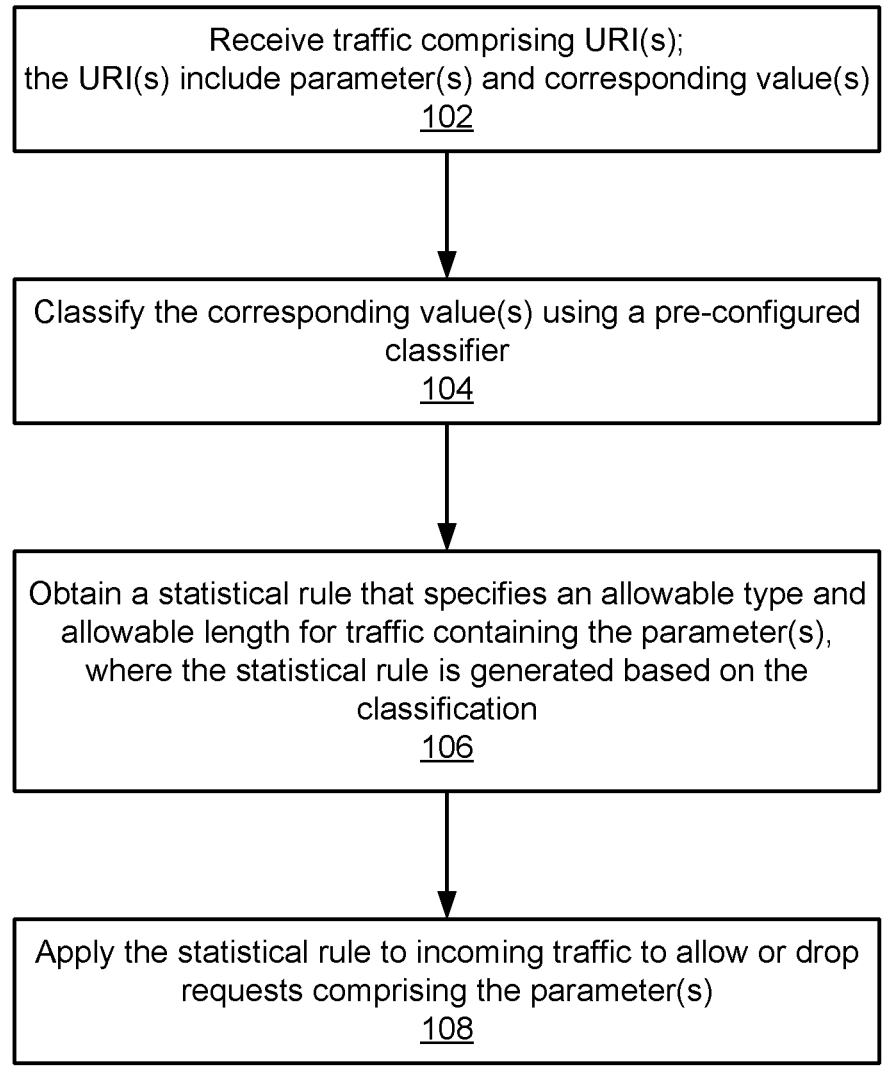
FIG. 1 is a flow chart illustrating an embodiment of a process for preventing attacks by learning from traffic patterns using a distributed firewall.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A conventional Web application firewall (WAF) typically examines an HTTP transaction by identifying signatures in the HTTP transaction. A signature is a piece of code known to be malicious, so finding a matching or similar signature in an HTTP transaction indicates that the HTTP transaction is an attack on the system. Attacks can be classified into one of several types depending on how the attacker is attempting to attack the system.

In an SQL injection attack, an attacker inserts a malicious SQL statement into an entry so that when the SQL statement is executed the attacker accesses or corrupts database contents. In a cross-site scripting (XSS) attack, an attacker uses cross-site scripting to inject client-side scripts into Web pages viewed by other users. For example the attacker sends malicious content with content that's delivered to a client-side Web browser. The client is then attacked because the client-side Web browser thinks that the malicious content originated from a trusted source. In a file inclusion attack, an attacker uses file inclusions to build a path to executable code using an attacker-controlled variable so that the attacker can control which file is executed at run time. These types of attacks as well other types of attacks can be identified by their signatures, which are characteristics or patterns of the attacks.

A backend application can prevent attacks by looking for signatures that occur in HTTP parameters. Conventional application layer firewalls typically use rules that are defined and refreshed by administrators but do not learn from traffic patterns to formulate rules or prevent attacks. In addition, as security attacks become more varied and sophisticated, checking for signatures in HTTP transactions can take significant time and processing resources because the many different types of signatures need to be stored and the backend application needs to check incoming traffic against the stored signatures. The techniques disclosed here decrease processing time by using less memory and fewer processing cycles to examine traffic (HTTP transactions) to accurately identify security risks.

Embodiments of a distributed firewall that learns from traffic patterns to prevent attacks are disclosed. In various embodiments, the firewall is implemented by service engines distributed across nodes. The distributed nature of the firewall is further discussed with respect to the example shown in FIG. 6. In various embodiments, the distributed firewall performs the example process shown in FIG. 1 to track input traffic to a system such as an example distributed system shown in FIG. 6 to determine whether an attack is occurring or to prevent future attacks. One or more service engines is configured to process the traffic and individually learn from the traffic patterns. A controller is configured to aggregate what the individual service engines have learned and formulate a rule to optimize subsequent handling of traffic to the system to prevent attacks. As further described below, the controller is configured to learn from parameters and values accompanying a request to determine whether the request (e.g., HTTP transaction) is malicious. The techniques disclosed here can be used to decide further actions such as whether to lightly inspect or deeply inspect incoming traffic. For example, heavy signature detection which is the deep examination of HTTP packets to identify signatures, is not needed to identify potential security attacks. The techniques disclosed here are scalable and can be performed in real-time.

FIG. 1 is a flow chart illustrating an embodiment of a process for preventing attacks by learning from traffic patterns using a distributed firewall. The process can be performed by a service engine and/or a controller such as the ones shown in FIG. 6. For example, a service engine is configured to receive traffic and perform classifications. A central controller is configured to formulate one or more statistical rules based on the traffic observed and classifications determined by the service engines. The service engines then obtain (e.g., look up or receive) the statistical rule(s) and apply the rule(s) to subsequence incoming traffic.

Returning to FIG. 1, the process begins by receiving traffic comprising uniform resource identifier(s) (URIs). The one or more URIs includes one or more parameters and one or more corresponding values (102). For example, a URI from a Web page form populated with a user's responses may have a parameter for a field (zipcode for example) and a corresponding value provided by the user (the zipcode number 10025 for example).

The process parses and analyzes the URIs to determine statistics about incoming traffic. More specifically, the process examines URI(s) to identify the parameters and their corresponding values by parsing hears and body for parameters and values in the received HTTP traffic. In various embodiments, the process samples the incoming traffic and stores characteristics in shared memory such as on a service engine, which is shown and further described with respect to FIG. 6. The process classifies the value(s) corresponding to the parameter(s) using a pre-configured classifier (104). The pre-configured classifier can be a trained engine that takes a value as input and outputs the type and length of the value. In various embodiments, classifying the value(s) includes obtaining type and length information associated with the parameter(s). The values can be classified based on their lengths. As further described with respect to FIGS. 2-4, the type can be a flag, digit, word, password, etc. and the length can be small, medium, large, etc. based on pre-defined or user-defined threshold (character, digit, etc.) lengths.

The classifier can be implemented or trained by a variety of techniques including pre-programming a dictionary, machine learning, among others. The output of the classifier can be used to determine how subsequent traffic is handled. For example, the output is used in some embodiments to formulate one or more statistical rules, and subsequent traffic is processed according to the rule(s). In various embodiments, the process creates a data structure such as a table to store parameters along with the associated frequency of the character class types and length ranges. An example table is shown in FIGS. 3A and 3B.

The process obtains a statistical rule that specifies an allowable type and allowable length for traffic containing the one or more parameters (among possibly other things), where the statistical rule is generated based on the classification (106). The rule is called a statistical rule because it can be generated on a per-policy and per-URI basis as the system learns as part of the data path. As further described below, the rule is formulated by observing parameters types and lengths and tracking their occurrences (frequencies or appearances) in incoming traffic. The system classifies a parameter by class and frequency, removes outliers, and collapses some classes. In various embodiments, the statistical rule is determined based on a frequency of appearance of the corresponding value(s). In various embodiments, the statistical rule includes a compressed representation of the path, parameter(s), and/or corresponding value(s). The parameter(s) in the statistical rule can be relative to a URI path.

The statistical rule can be used for a variety of security models including a positive security model in which rules define how an application should behave. Unlike a negative security model which specifies what is not allowed (e.g., a blacklist), a positive security model defines what is allowed. For example, a negative security model has a list of disallowed zip codes while a positive security model allows zip codes of a specific length, prefix, etc. Rules in a negative security model can be too stringent and not allow good traffic simply because it has not seen that exact traffic before. The efficacy of a firewall depends on rules are that are well-defined and the techniques disclosed here help to formulate good rules that are neither too broad nor too narrow. In a positive security model, a system starts out not knowing all combination of allowed behavior, but using the techniques disclosed here the system learns from traffic patterns to determine rules defining what traffic will be allowed in the future.

The process applies the statistical rule to incoming traffic to allow or drop requests comprising the one or more parameters (108). If a value matches the expected format (e.g., type and length) of the parameter specified by the rule, then that parameter is skipped for further inspection because the match confirms that this is an appropriate action. If all of the parameters match the learned format, then the request is allowed without performing expensive signature checks in various embodiments. Otherwise the request is dropped. As further described with respect to FIG. 2, a rule can specify that a URI containing a parameter ending in a digit is expected to be a value that is a word of medium length (word is the type and medium is the length). If the value is a not a medium word then the URI may be an attack and the process blocks the traffic.

The process of FIG. 1 will now be described using the next figure, which shows an example of a URI, classification of URI components, and a statistical rule formulated based on the classification.

Figure 2:
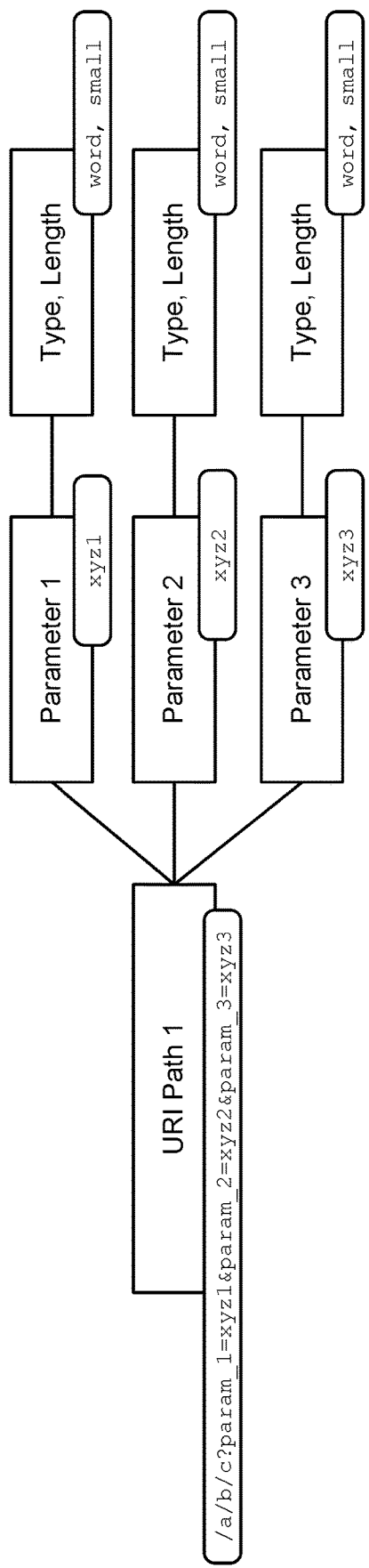
FIG. 2 shows an example of traffic handling using a distributed firewall by learning from traffic patterns to prevent attacks.

FIG. 2 shows an example of traffic handling using a distributed firewall by learning from traffic patterns to prevent attacks. In various embodiments, a web application firewall policy is initially default (e.g., a default set of signatures). As web traffic comes in, service engines analyze the transactions using the process of FIG. 1. In various embodiments, to minimize false positives, learning is performed only on HTTP transactions that are successful. The web application firewall policy can be updated using the analysis by formulating rules to add to the web application firewall policy.

An example of an incoming URI path is Path 1, which is "/a/b/c?param_1=xyz1&param_2=xyz2&param_3=xyz3". For simplicity, this example shows the path portion of the URI string and omits the scheme and authority. The example includes a path portion "/a/b/c" and three parameters, param_1, param_2, and param_3. Each of the parameters has a corresponding value. The value of param_1 is xyz1, the value of param_2 is xyz2, and the value of param_3 is xyz3. Each value is classified using a pre-configured classifier. A data structure is maintained for parameters in incoming transactions. The data structure stores the frequency of character class types and length ranges. In this example, the classifier classifies its input according to its type and length. Here, each of the values (xyz1, xyz2, and xyz3) is a small word meaning each is of type word and length small as further described below with respect to FIGS. 3A and 3B. The classification results can be stored in a data structure such as the ones shown in the following figures.

FIG. 3A shows an example of classifying value types corresponding to parameters of a uniform resource identifier (URI). The table shown in this figure is an example of a data structure for storing a class type of a parameter value and an associated frequency of the value class type.

The example class types shown in FIG. 3A is merely exemplary and not intended to be limiting. In other embodiments, fewer or more class types may be used. As shown, a flag is an empty value, digits are in the range of [0, 9], hex digits are in the range of [0-9A-Fa-f], a word is in the range of [A-Za-z0-9_], text is in the range of [A-Za-z0-9_SPC, TAB, \r, \v, \f], text_multiline is the same as text and also including \n, safe_text is the same as text and including /!?.=( ), safe_text_multiline is the same as text_multiline and including /!?.=( ), password includes in the range [A-Za-z0-9!@#$%^&*( )_+-=[ ]{ };':",./?], special is the same as safe_text_multiline and including [ ]<>|""&\%, and other covers everything else such as binary characters. The character classes may include different allowed digits or characters. For example, passwords may permit additional/other special characters or fewer special characters depending on system configurations. Referring to URI Path 1 shown in FIG. 2, there are three parameters param_1, param_2, and param_3. The value of param_1 is xyz1, the value of param_2 is xyz2, and the value of param_3 is xyz3.

Since each of the values (xyz1, xyz2, and xyz3) has a mix of alphabet letters and digits, it is classified as the type "word." The appearance of each of the values is stored by incrementing the frequency associated with class type "word."

FIG. 3B shows an example of classifying length types corresponding to parameters of a uniform resource identifier (URI). The example length types shown in FIG. 3B is merely exemplary and not intended to be limiting. In other embodiments, fewer or more length types may be used. In this example, an empty length is an empty value, i.e., 0 bytes. A small length is 1-16 bytes, a medium length is 17-64 bytes, a large length is 65-1024 bytes, and a huge length is at least 1025 bytes. Since each of the values (xyz1, xyz2, and xyz3) is four bytes long, it is of length "small."

Frequency can be counted in a variety of ways. In one example, after receiving URI Path 1, the service engine records the class type "word" has frequency 3 since xyz1 counts once, xyz2 counts once, and xyz3 counts once. In another example, Path 1 param_1 counts once, Path 1 param_2 counts once, and Path 1 param_3 counts once. The params (param_1, param_2, and param_3) are combined to from the regex param \d whose frequency is the sum of occurrences, i.e., 3. The service engine records length type "small" has frequency 3 since xyz1 counts once, xyz2 counts once, and xyz3 counts once.

As transactions come in, the service engine learns from the transactions. The service engine learns by populating the data structures to see the frequencies of various class types and lengths. In various embodiments, the service engine will continue to observe traffic and classify parameter values by type and length until a condition has been met. The condition can be pre-defined or user defined such as a time duration or threshold frequency. An example of a time duration is one hour. An example of a threshold frequency is 99% for a specified type and 1% for other type(s), and another example is 90% for a specified type and 10% for other type(s). These conditions can be set based on an expectation that the service engine will have learned sufficient information to be confident (by some %) that a parameter should be a particular type and length. Suppose in the span of one hour, 1 million HTTP transactions to URI Path 1 were served. Among the transaction, 990,000 were classified with param_1 as a small word. The remainder (10,000) were classified differently. There is a 99% probability that param_1 is a small word. The frequency information can be used to program a statistical rule stating the parameter is expected to be a small word so that all other types of values cause the corresponding transaction to be blocked. An example of a rule is: /path/p1 Name WORD SMALL. This means that a name parameter is expected to have a value that is a small word. In this example, Thus, a rule is programmed to enforce the expectation that future param_1 is a small word.

In various embodiments, the web application firewall can be periodically or continually improved. For example, after the first hour, the service engines continue to observe and process traffic for the next hour and formulates or updates the statistical rules making up the firewall based on the second hour of transactions. Over time, the web application firewall can be improved while still being effective in the earlier stages of deployment, i.e., even in the first hour a meaningful statistical rule can be determined.

In various embodiments, the information maintained and stored in the data structures described above is collected by service engines. The information is sent to a central controller, and the central controller aggregates the information across service engines. The controller can construct a superset class based on the frequencies of the various character class types and length types. The superset class (sometimes simply called a "superclass") can be constructed from data from a single service engine or from aggregation of data across multiple service engines.

In various embodiments, classification results are processed to remove outliers such as those value with low frequency (frequency below a threshold). For example, those data that do not meet a minimum confidence threshold are deemed insignificant data and removed for subsequent analysis purposes. In various embodiments, the classification of the value(s) includes determining a superclass that encompasses a threshold amount of classification results. Some classes can be collapsed (e.g., combined or merged) to identify a superset. The next figure shows a process for identifying a superset.

Figure 4A:
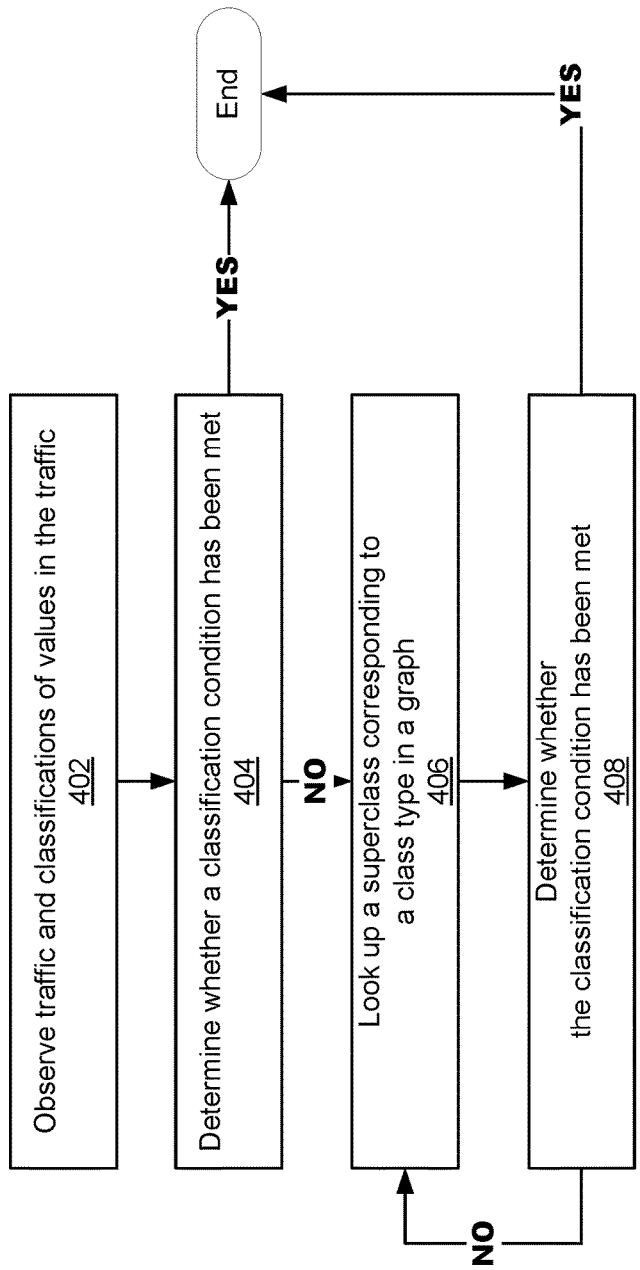
FIG. 4A is a flow chart illustrating an embodiment of a process for identifying a superset when classifying a value from a URI path.

FIG. 4A is a flow chart illustrating an embodiment of a process for identifying a superset when classifying a value from a URI path. The process can be performed by a service engine and/or a controller such as the ones shown in FIG. 6. The process can be performed as part of another process, for example as part of 104 of the process shown in FIG. 1.

The process begins at 402 by observing traffic and classifications of values in the traffic. For example, the traffic includes URI paths having parameters and corresponding values. As described with respect to 104, a pre-configured classifier takes a value as input and outputs the type and length of the value. The values can be classified based on their lengths.

At 404, the process determines whether a classification condition has been met. When a classification condition is met that means the classification is satisfactory and considered complete for the purposes of obtaining a statistical rule in various embodiments. The condition can be a threshold frequency such as 90%. Sometimes, without combining classes it may be difficult to reach the threshold frequency. Suppose 50% of transactions are classified as digits, 48% are classified as hex digits, and the remainder are classified in one of the other categories. If the threshold frequency is 90%, then the threshold has not been met. However, if digits and hex are combined into a single superclass, then frequency will become 98%, which does meet the threshold. Thus, in such a situation, it is appropriate to promote a digit to a hex digit so that a statistical rule can be correctly formulated from this analysis.

If the classification condition has been met, the process ends. For example 104 of FIG. 1 is complete since classification is complete and next a statistical rule can be obtained based on the classification. Otherwise if the classification condition has not been met, the process proceeds to 406, to look up a superclass corresponding to a class type in a graph. In various embodiments, the same graph can be used for all URI paths because they are expected to be formatted in the same way. In various embodiments, several graphs store different class to class mappings and the appropriate graph is selected based on characteristics of the received URI path.

Figure 4B:
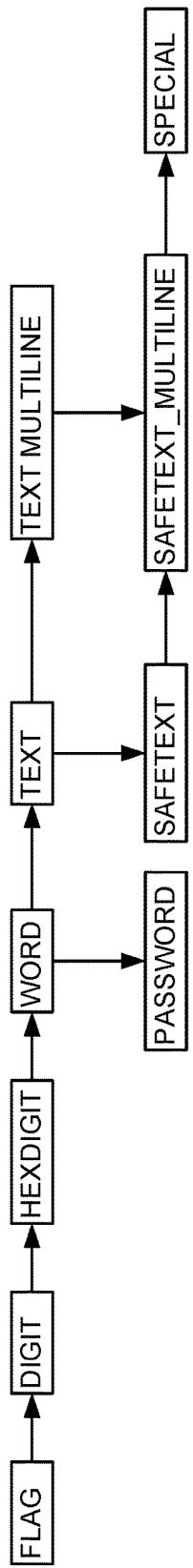
FIG. 4B shows an example graph of character classes including some that can be combined to form a superclass.

FIG. 4B shows an example graph of character classes including some that can be combined to form a superclass. The classes correspond to the ones shown in FIG. 3A. A class points to another class that can be a super class. For example, "digit" points to "hex" meaning hex is a super class of digit. This is because a digit is an example of a hex digit. In some cases, as further explained below, it may be appropriate to combine one or more classes to form a superclass.

The process may determine that the classification is combined into a superclass as follows. Given a set of probable types, the process begins from the lowest node (flag in the example of FIG. 4) to see if a path (along the arrows) exists to any other nodes. If such a path exists, the starting node is a subset of a node that the arrow points to (ending node) and the corresponding category of the starting node is eliminated and combined with the next higher/broader type of the ending node. For example, if the probable types for the parameter are {flag, digit}, flag can be collapsed into the digit class. In various embodiments, if the result of collapsing classes is more than one ending node, then the superclass can be of type "other."

After looking up a superclass corresponding to a class type in the graph, the process determines whether a classification condition has been met. If the classification condition has been met, the process ends. For example 104 of FIG. 1 is complete since classification is complete and next a statistical rule can be obtained based on the classification. Otherwise if the classification condition has not been met, the process proceeds to 406, to look up another superclass corresponding to a class type in a graph.

Suppose a table (like the one of FIG. 3A) storing class types of transactions seems so far has classified all values as either a digit, text, or safetext_multiline but none of the frequencies meet the threshold. The digit, text, or safetext_multiline can be combined to text and safetext_multiline, which in turn can be combined into safetext_multiline. If combining two classes into a single superclass does not meet the threshold, combining three classes into a single class may help meet the threshold. Thus, the process can repeatedly look up a superclass (406) until a classification condition is met.

Referring to the graph in FIG. 4B, suppose the classification condition is that a class type has 90% of all occurrences, but currently 30% are words, 20% are text, 40% are safetext. Combining digit and text into one superclass would yield a superclass (text) with 50%, which does not meet the classification condition. Next, combining superclass (text) with safetext to form superclass (safetext) would yield a superclass (text) with 90%, which does meet the classification condition. Thus, combining word, text, and safetext into a single superclass helps to meet the classification condition.

Although the example above is for class type classification, length classes can be determined similarly. For example, an empty length (0 bytes) can be combined with small length (1-16 bytes) and medium length (17-64 bytes), while large length (65-1024 bytes) can be combined with huge length (1025 bytes) to form two classes (e.g., moderate superclass includes empty, small and medium and big superclass includes large and huge) so classifications might more easily meet a threshold because there are fewer buckets. As another example, among the order of frequencies, the best fit is taken. Suppose 30% are small, 30% are medium, and 30% are huge. The collapsed superclass can be a single superclass, which is the huge class.

Once the best (e.g., most descriptive) parameter value class types and length types are determined or learned, then rules can be applied to determine what type of web application firewall inspection (light or heavy) to apply to traffic. A service engine can apply a statistical rule as follows. Suppose the rule is /path/p1 Name WORD SMALL. This means that a name parameter is expected to have a value that is a small word.

The service engine checks an incoming HTTP transaction for conformance with the rule. If the transaction conforms to the rule meaning the parameter has a value that is a small word, then the transaction does not need further signature inspection and can be allowed to pass, which saves the processors from performing the costly signature-matching step.

In various embodiments, rules are implemented in a tree-style data structure so that a given path has a single lookup. This allows many rules to be applied to implement a distributed Web application firewall. For example, an intelligent tree summarizes the paths and parameters for concise representation. The characteristics of combined parameters can be merged in some cases. The next figure shows an example of combining a path, parameter, or value associated with an URI.

Figures 5A, 5B:
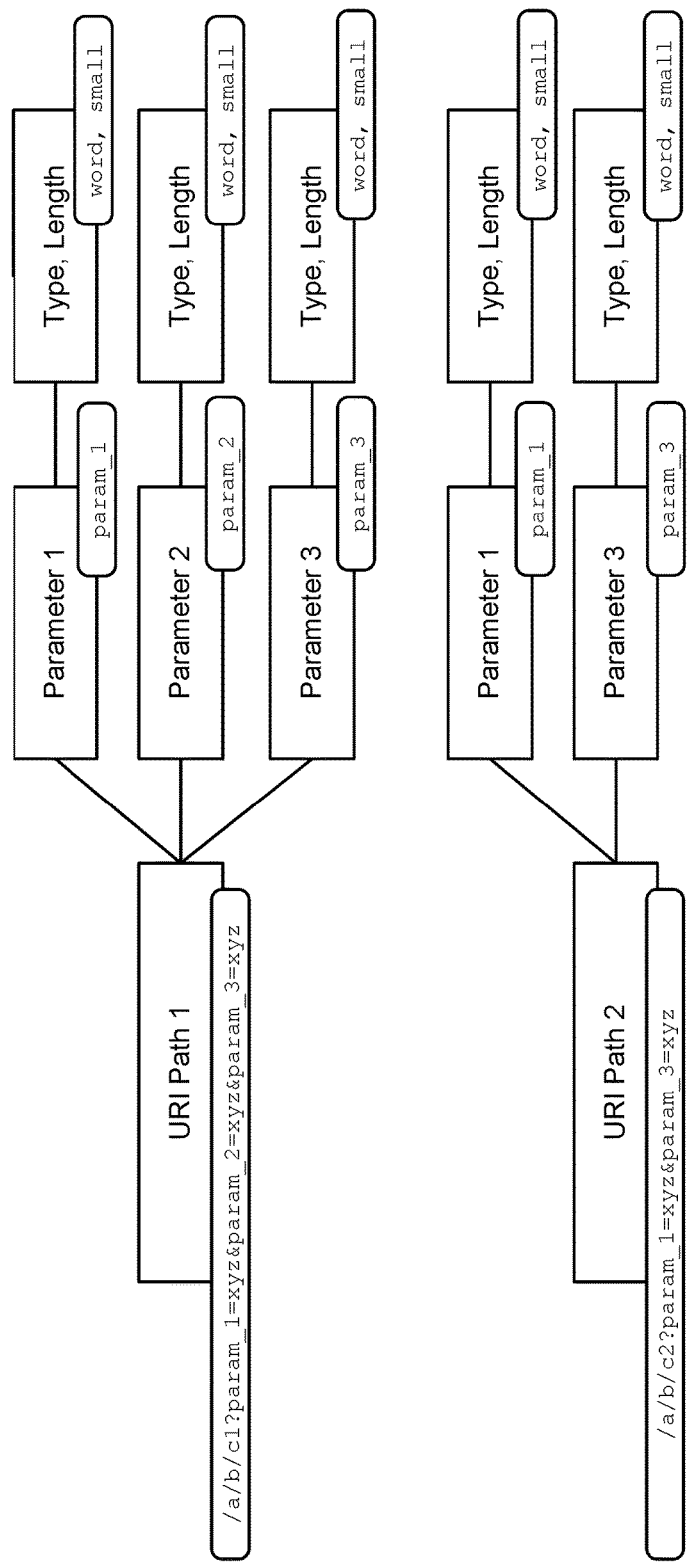
FIG. 5A shows an example of forming a compressed representation of a path, parameter, or value associated with a uniform resource identifier (URI).
FIG. 5B shows an example of a compressed representation of a path and a parameter formed from the example shown in FIG. 5A.

FIG. 5A shows an example of forming a compressed representation of a path, parameter, or value associated with a uniform resource identifier (URI). The example shows three separate URI paths. The paths are processed using the process of FIG. 1 and in a similar manner to FIG. 2 to obtain the frequencies of character class types and length types. For simplicity the breakdown for URI Path 1 and Path 2 are shown but not for Path 3.

Several parameters can be captured in a single rule. Suppose a parameter ends in a decimal digit (e.g., param_1, param_2, and param_3). Instead of having three separate rules for each of the parameters, a compressed representative rule is: /a/b/c param_\d WORD SMALL, where /a/b/c corresponds to the path, \ d is PCRE syntax for a decimal digit, and the rule means that for a URI including the given path of /a/b/c and a parameter of form param_\d, i.e., param followed by a digit (such as param_1, param_2, or param_3) the parameter is expected to have a value that is a small word. The small word can be determined based on the example above (assuming the value of param_1=xyz1, param_2=xyz2, or param_3=xyz3).

As shown in FIG. 5A, several paths can be captured in a single rule. Suppose these paths were received separately as part of the traffic observed by a service engine. In this example, some paths end in a decimal digit (e.g., /a/b/c1, /a/b/c2, and/a/b/c3) and include parameters that also end in a digit. More specifically, the following paths can be compressed:

Path 1: /a/b/c1?param_1=xyz&param_2=xyz&param_3=xyz
Path 2: /a/b/c2?param_1=xyz&param_3=xyz
Path 3: /a/b/c3?param_1=xyz¶m_2=xyz Instead of having three separate rules for each of the paths, a compressed representative rule is: /a/b/c \ d param_\d WORD SMALL as shown in FIG. 5B.

Several paths or parameters can be compressed by constructing a trie data structure. For example, in the three paths example above, the paths are compressed to be /a/b/c \ d because for Path 1 (/a/b/c1), a data structure would be constructed with/a as the root, /b as a child of /a, /c as a child of /b, and "1" as the child of /c. Path 2 looks just like the first except that the lowest level child is "2" instead of "1." Thus, what all of the paths have in common is a digit following /a/b/c, so the paths can be compressed to be "/a/b/c \ d." FIG. 5B shows an example of a compressed representation of a path and a parameter formed from the example shown in FIG. 5A. The compression of the path is "/a/b/c \ d," and the compression of the parameter is param \d.

Backend applications can change over time. To efficiently accommodate changes, the learned characteristics can be aged over a time series (e.g., five 1-minute intervals) such that only actively seen URI paths and parameters are used for classification and statistical rule formulation. For example, paths and parameters that are obsolete are not pushed to the service engine and/or controller.

Figure 6:
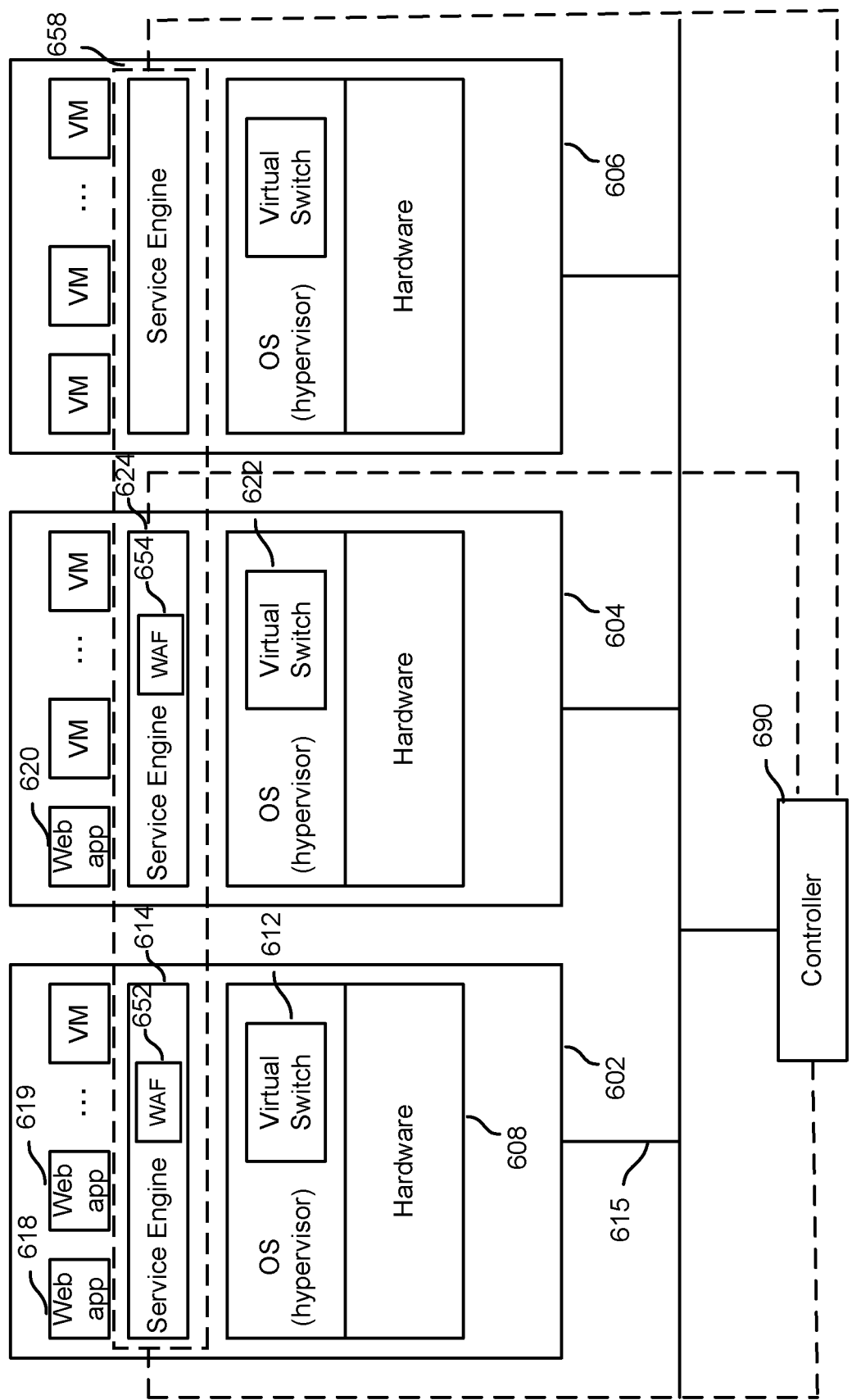
FIG. 6 is a functional diagram illustrating an embodiment of a distributed service platform that provides a web application firewall service.

FIG. 6 is a functional diagram illustrating an embodiment of a distributed service platform that provides a web application firewall service.

In this example, the platform includes a number of servers configured to provide a distributed network service. A physical server (e.g., 602, 604, 606, etc.) has hardware components and software components, and may be implemented using a device such as a processing device 700 of FIG. 7. In particular, hardware (e.g., 608) of the server supports operating system software in which a number of virtual machines (VMs) (e.g., 618, 619, etc.) are configured to execute. A VM is a software implementation of a machine (e.g., a computer) that simulates the way a physical machine executes programs. The part of the server's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®.

In some embodiments, instances of network applications are configured to execute within the VMs. Examples of such network applications include web applications such as shopping cart, user authentication, credit card authentication, email, file sharing, virtual desktops, voice/video streaming, online collaboration, etc. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch (e.g., 612, 622, etc.). A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines (e.g., 614) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. For example, a firewall module is executed to provide Web application security to instances of the target applications on various devices to implement the distributed web application firewall disclosed herein; a load balancer component is executed to provide load balancing logic to distribute traffic load amongst instances of target applications executing on the local physical device as well as other physical devices. Many other service components may be implemented and enabled as appropriate. When a specific service is desired, a corresponding service component is configured and invoked by the service engine to execute in a VM.

In some embodiments, the performance of the target applications is monitored by the service engines, which are in turn monitored by controller 690. In some embodiments, all service engines maintain their own copy of current performance status of the target applications. A dedicated monitoring service engine is selected to send heartbeat signals (e.g., packets or other data of predefined format) to the target applications and update the performance status to other service engines as needed. For example, if a heartbeat is not acknowledged by a particular target application instance within a predefined amount of time, the monitoring service engine will mark the target application instance as having failed, and disseminate the information to other service engines. In some embodiments, controller 690 collects performance information from the service engines, analyzes the performance information, and sends data to client applications for display.

A virtual switch such as 612 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). As will be described in greater detail below, in some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application executes. In some embodiments, a service engine sends data to and receives data from a target application via the virtual switch.

In various embodiments, the service engines include a learning engine (not shown). The learning engine processes an HTTP transaction by parsing the head and body and sending the parameter(s) and associated value(s) to a pre-configured or pre-trained classifier. Each service engine learns independently and pushes its classification results to a central controller. In other words, the service engine is configured to receive traffic, classify one or more corresponding values, and report classification results to a central controller. The controller 690 can aggregate classification results across service engines to determine a statistical rule. For example, the controller can maintain a data structure like the ones shown in FIGS. 3A and 3B and track the frequencies of class types and lengths across several service engines. In various embodiments, a statistical rule such as the one determined using the process shown in FIG. 1 is determined by/obtained from a controller. The statistical rule can be part of a web application firewall policy to help process subsequently-received traffic by applying the rule to the traffic to determine whether to allow or block the traffic.

A controller 690 is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof. In some embodiments, the controller is deployed within the VM of a physical device or other appropriate environment. In some embodiments, the controller interacts with client applications to provide information needed by the user interface to present data to the end user, and with a virtualization infrastructure management application to configure VMs and obtain VM-related data. In some embodiments, the controller is implemented as a single entity logically, but multiple instances of the controller are installed and executed on multiple physical devices to provide high availability and increased capacity. In some embodiments, known techniques such as those used in distributed databases are applied to synchronize and maintain coherency of data among the controller instances.

In the example shown, the service engines cooperate to function as a single entity, forming a distributed network service layer 656 to provide services such as distributed web application firewall to the target applications. In other words, although multiple service engines (e.g., 614, 624, etc.) are installed and running on multiple physical servers, they cooperate to act as a single layer 656 across these physical devices. In some embodiments, the service engines cooperate by sharing states or other data structures. In other words, copies of the states or other global data are maintained and synchronized for the service engines and the controller.

In some embodiments, a single service layer is presented to the target applications to provide the target applications with services. The interaction between the target applications and service layer is transparent in some cases. For example, if a load balancing service is provided by the service layer, the target application sends and receives data via existing APIs as it would with a standard, non-distributed load balancing device. In some embodiments, the target applications are modified to take advantage of the services provided by the service layer. For example, if a compression service is provided by the service layer, the target application can be reconfigured to omit compression operations.

From a target application's point of view, a single service layer object is instantiated. The target application communicates with the single service layer object, even though in some implementations multiple service engine objects are replicated and executed on multiple servers.

Traffic received on a physical port of a server (e.g., a communications interface such as Ethernet port 615) is sent to the virtual switch (e.g., 612). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine, based on factors such as configured rules and operating conditions, redirects the traffic to an appropriate target application executing in a VM on a server. The service engine observes and processes the traffic according to the techniques disclosed herein to provide a web application firewall that learns from traffic patterns to prevent attacks on platform components including target applications and backend servers.

Figure 7:
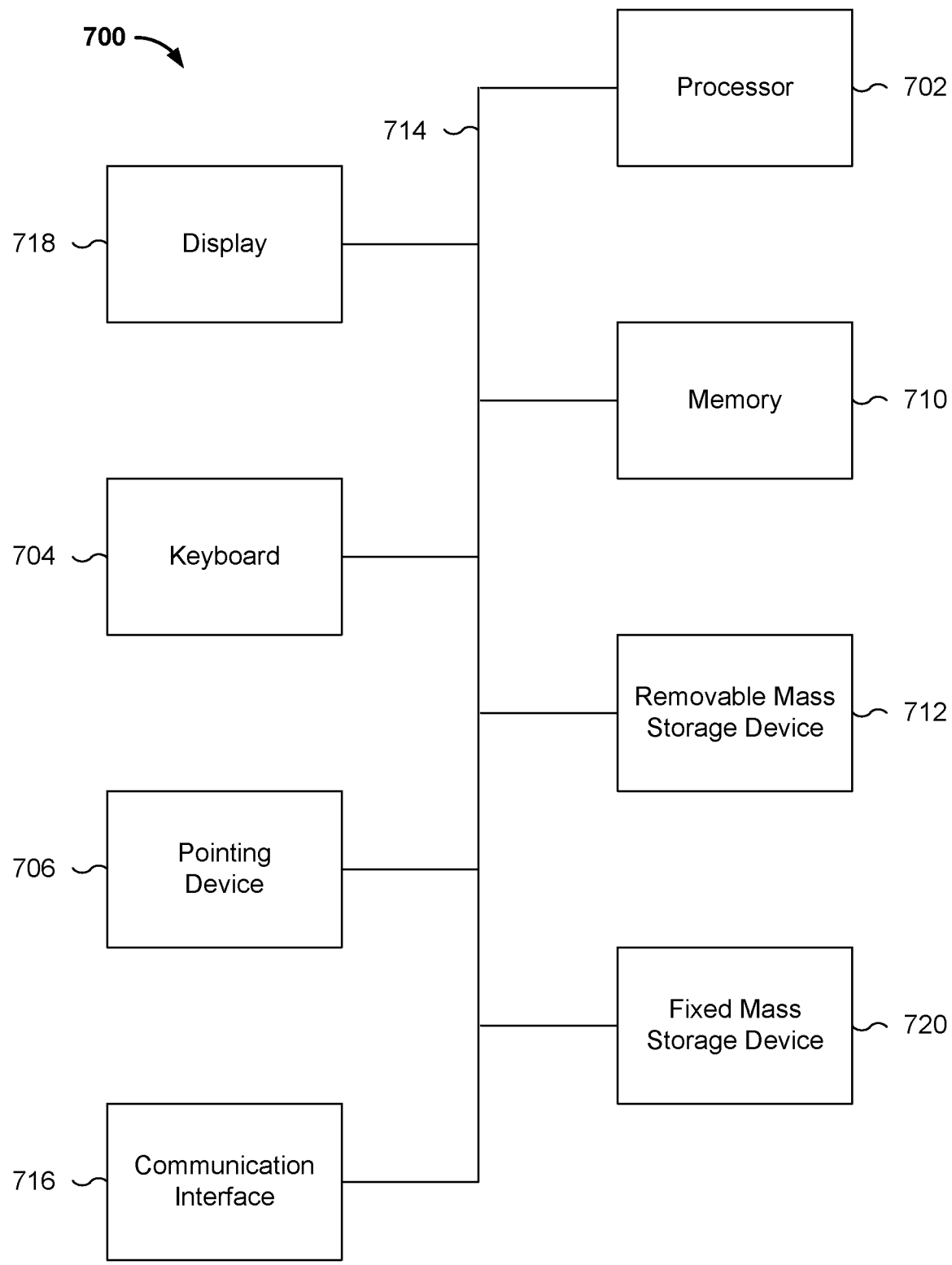
FIG. 7 is a functional diagram illustrating a programmed computer system for implementing a distributed Web application firewall service in accordance with some embodiments.

FIG. 7 is a functional diagram illustrating a programmed computer system for implementing a distributed Web application firewall service in accordance with some embodiments. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In some embodiments, system 700 includes multiple processors 702.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage 712, 720 generally store additional programming instructions, data, and the like that typically are not in active use by the processor 702. It will be appreciated that the information retained within mass storage 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a communication interface (also referred to as a network interface) 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The communication interface 716 allows processor 702 to be coupled to another computer, computer network, or telecommunications network using a network connection as shown. For example, through the communication interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through communication interface 716. Examples of a communication interface include without limitation external connections, such as a port, cable, wireline, or wireless network interface card, etc., and internal connections such as a communication bus.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The techniques described above have several advantages over conventional web application firewalls. In one aspect, the techniques prevent zero-day attacks or attacks that happen before an administrator knows that the attack signature looks like. For example, the techniques can be used to learn from traffic to efficiently and accurate form rules for web application firewall policies within a user-definable time (e.g., one hour). After observing traffic for one hour, the system may be sufficiently confident to formulate a rule to prevent attacks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing a distributed web application firewall (WAF) operation on a plurality of computers, the method comprising:
configuring each of a plurality of service engines executing on the plurality of host computers to parse uniform resource identifiers (URIs) from packets received at the host computer and to perform classification operations based on parameter values specified by the parsed URIs, the classification operations producing data structures that specify attributes of the parameters specified by the parsed URIs;
configuring each service engine in the plurality of service engines to provide data stored in the produced data structures to a controller regarding the parameter values specified by the parsed URI; and
configuring the controller to aggregate the data provided from all of the service engines, produce statistical-based firewall rules, and distribute the statistical-based firewall rules to the service engines to enforce on packets received at the host computers, the controller maintaining a data structure to track data produced and provided by the service engines.

2. The method of claim 1, wherein the firewall rules specify whether the packets should be allowed to pass through.

3. The method of claim 1, wherein the firewall rules specify whether the packets should be dropped.

4. The method of claim 1, wherein at least one statistical rule specifies an allowable type and an allowable length for parameter values extracted from the data packets.

5. The method of claim 1, wherein configuring the controller comprises configuring the controller to construct a superset class of a plurality of class types identified by the service engines for the parameters specified by the parsed URIs.

6. The method of claim 5, wherein the plurality of class types comprises a plurality of length types.

7. The method of claim 5, wherein the superclass encompasses a threshold amount of classification results produced by the service engines.

8. The method of claim 1, wherein at least one statistical rule is based at least in part on a frequency of appearance of the one more corresponding parameter values.

9. The method of claim 1, wherein at least one statistical rule includes a compressed representation of one or more URIs, one or more parameters, and one or more corresponding values of the parameters.

10. A system for performing a distributed web application firewall (WAF) operation, the system comprising:
a plurality of computers and a memory;
a controller; and
a plurality of service engines executing on the plurality of host computers, each service engine configured (i) to parse uniform resource identifiers (URIs) from packets received at the host computer, (ii) to perform classification operations based on parameter values specified by the parsed URIs, the classification operations producing data structures that specify attributes of the parameters specified by the parsed URIs, and (iii) to provide data stored in the produced data structures to a controller regarding the parameter values specified by the parsed URI,
the controller configured to aggregate the data provided from all of the service engines, to produce statistical-based firewall rules, and to distribute the statistical-based firewall rules to the service engines to enforce on packets received at the host computers, the controller maintaining a data structure to track data produced and provided by the service engines.

11. The system of claim 10, wherein the firewall rules specify whether the packets should be allowed to pass through.

12. The system of claim 10, wherein the firewall rules specify whether the packets should be dropped.

13. The system of claim 10, wherein at least one statistical rule specifies an allowable type and an allowable length for parameter values extracted from the data packets.

14. The system of claim 10, wherein the controller is configured to construct a superset class of a plurality of class types identified by the service engines for the parameter values specified by the parsed URIs.

15. The system of claim 14, wherein the plurality of class types comprises a plurality of length types.

16. The system of claim 14, wherein the superclass encompasses a threshold amount of classification results produced by the service engines.

17. The system of claim 10, wherein at least one statistical rule is based at least in part on a frequency of appearance of the one more corresponding parameter values.

18. The system of claim 10, wherein at least one statistical rule includes a compressed representation of one or more URIs, one or more parameters, and one or more corresponding values of the parameters.

* * * * *